May 6, 1969
R. KATES
3,442,201
PIVOTED SPIT AND FIREBOX ASSEMBLY FOR BARBECUE GRILLS
Filed Feb. 10, 1967
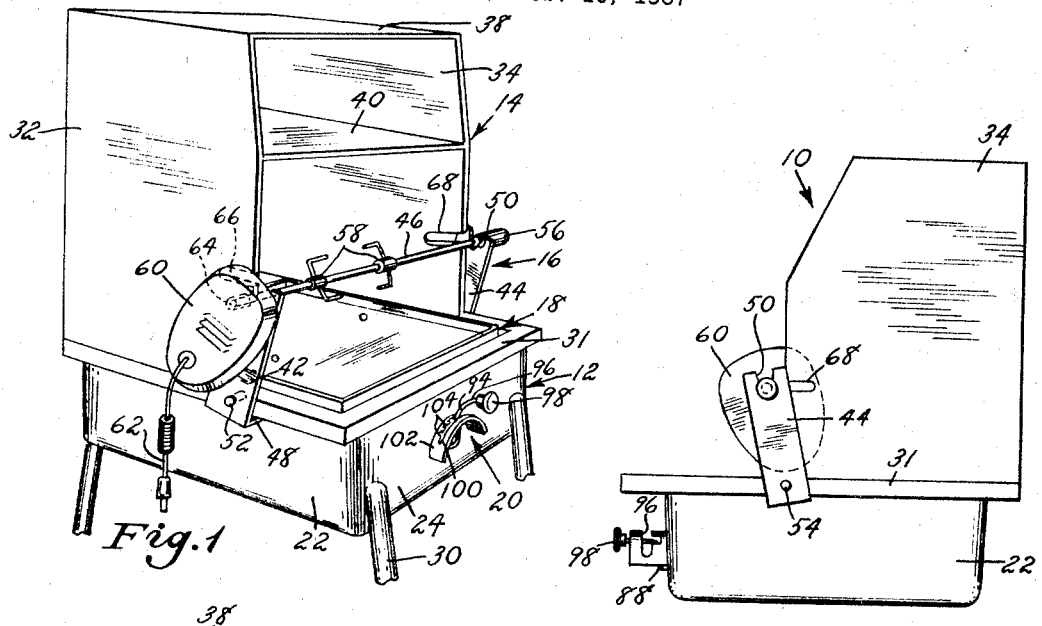
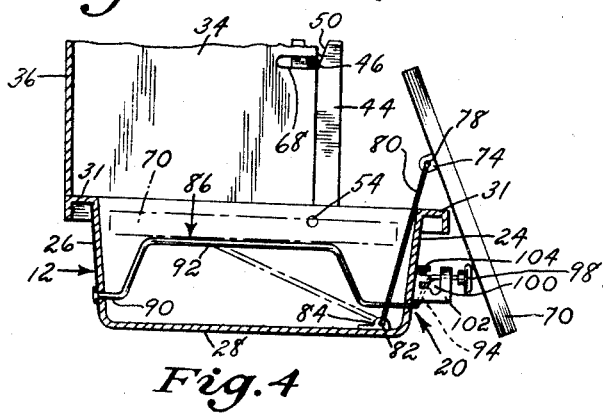
INVENTOR.
RICHARD KATES
BY
Edward L. Levy
ATTORNEY United States Patent Office 3,442,201
Patented May 6, 1969

3,442,201
PIVOTED SPIT AND FIREBOX ASSEMBLY FOR BARBECUE GRILLS
Richard Kates, Madison, N.J., assignor to Federal Steel Corporation, Raratin, N.J., a corporation of New Jersey
Filed Feb. 10, 1967, Ser. No. 615,228
Int. Cl. A47j 37/04
U.S. Cl. 99—421                          1 Claim

ABSTRACT OF THE DISCLOSURE

An apparatus for providing access to the motor driven spit and the interior of the firebox of a barbecue grill having a hood enclosing a heating zone. The spit and its motor are mounted on support plates pivoted to the base of the grill for movement of the spit between a retracted operative cooking position within the heating zone and an extended, accessible position outside the heating zone. The fire tray is movably mounted within the base by links which permit the same to be raised and lowered relative to the spit and to be tilted for discharging fuel ashes therefrom. Means are provided for adjusting the vertical position of the fire tray beneath the spit for selectively varying the heat intensity applied to the food on the spit.

---

Barbecue grills of the outdoor type have become increasingly popular with the growth of surburban living, and the structural development of such grills has advanced to the stage where many models are provided with motorized spits for rotating foods above the charcoal fire. In utilizing such a motorized grill, however, much difficulty is encountered in loading and removing foods from the grill, since the spit is located directly over the burning charcoal fuel, the heat of which cannot be selectively regulated, and the presence of the food in the heat zone makes access to the food hazardous.

Other disadvantages of the present grills are the difficulty of varying the intensity of the heat applied to the food, and the problems attendant to the removal of ashes of the charcoal or other fuel materials after cooking has been completed.

It is the principal object of the present invention to provide an outdoor grill having an improved multipoint supported hinged spit assembly which is movable to permit the food upon the spit to be brought outside the heating zone for attendance, removal or replacement, while still providing support for the spit of each end thereof.

Another object of the present invention is to provide an outdoor grill of the character described which is provided with a movably mounted fire tray so arranged as to allow easy removal of the firing materials or their ashes.

A further object of the present invention is to provide an outdoor grill of the character described in which the intensity of the heating zone applied to the food may be varied by raising or lowering the fire tray in a simple and easy manner.

In accordance with the invention, there is provided in a barbecue grill having a hollow base and a hood partially overlying the base to enclose a heating zone, a spit and motorized drive means therefor carried by a pair of pivoted plates movably mounted on a stationary portion of said grill for movement between an operative position in which said spit is located within the interior of said hood and the heating zone therein, and an extended position in which the spit is located outside said hood and remote from said heating zone. The heating zone is created by ignited fuel contained in an open-top firebox located within said base, and means are provided for mounting the firebox in said base for movement in an upward and forward direction whereby the tray may be lifted out of the base and tilted forwardly for ejection of its contents. Means are also provided for selectively adjusting the vertical position of the firebox relative to the spit, for varying the heat intensity in the vicinity of the spit.

Additional objects and advantages of the invention will be apparent during the course of the following specification when taken in connection with the accompanying drawings, in which:

FIG. 1 is a front perspective view of a barbecue grill made in accordance with the invention and showing the hinged spit assembly in a forwardly position outside the heating zone;

FIG. 2 is a side elevational view of the grill of FIG. 1, with the spit assembly also in forward position;

FIG. 3 is a perspective view of the grill, similar to FIG. 1, but showing the firebox or tray moved outwardly of the hollow base and tilted forwardly, and the hinged spit assembly in its rearward operative position within the heating zone;

FIG. 4 is a partial side elevational view of the lower grill portion in the position of FIG. 3, with portions broken away and shown in section to reveal internal construction; and FIG. 5 is a partial front elevational view of the lower portion of the grill in the position of FIG. 1.

Referring in detail to the drawings, and particularly to FIG. 1, there is shown a barbecue grill designated generally by reference numeral 10, of the type comprising a hollow base 12 serving as a firebox and having a hood 14 mounted thereon. The grill 10 also includes a spit assembly 16, a movable fire tray assembly 18, and a fire intensity adjustment assembly 20.

More particularly, the base 12 is in the form of a hollow metal box having an open top end, and may be of any suitable shape. In the embodiment illustrated, the base 12 is rectangular having side walls 22, front wall 24, rear wall 26, and a bottom wall 28. The base 12 is supported by legs 30. At its upper open end, the base 12 is bordered by an integral, channel-shaped peripheral flange 31.

The hood 14 is shaped to conform to the base 12, and to enclose the rear portion thereof. In the embodiment shown, the hood 14 has upstanding side walls 32 and 34, a rear wall 36, a top wall 38, and a partition wall 40 which defines an upper oven chamber. The hood 14 is secured to the rear portion of the flange 31 in flush registry with the outer surface thereof, as shown in FIGS. 3 and 4.

The spit assembly 16 comprises a pair of sturdy metallic support plates 42 and 44 between which a spit 46 is supported, said plates 42 and 44 each having an inturned perpendicular flange 48 at its bottom end. At the top edge of each support plate 42 and 44 is formed a V-shaped slot 50 sized to receive and cradle the spit 46 for rotation of the latter within said slots 50. The support plates 42 and 44 are pivotally mounted adjacent their lower ends on base 12 by respective pivots 52 and 54 in the form of rivets extending through the sides of flange 31, as shown in FIG. 5.

The spit 46 is in the form of a metal rod of square cross-section having a handle 56 secured to one end, and its other end pointed for impaling food thereon. The spit is adapted to slidably mount one or more conventional tine members 58 which are adjustable for securely gripping the food impaled on the spit.

Mounted on the outer surface of the support plate 42 is a motor housing 60 of conventional type containing an electric motor and gear train (not shown) powered through an electric line cord and plug 62. The gear train terminates in the usual manner in a driven mandrel socket 64 sized and shaped to receive the end portion of spit 46, and provide a drive connection therewith.

Extending rearwardly from the front edges of the respective hood side walls 32 and 34 are a pair of transversely aligned elongated slots 66 and 68. These slots 66 and 68 are in registry with the respective V-shaped slots 50 of the supported plates 42 and 44, and are each slightly curved in an arc substantially concentric with the pivots 52, 54. The slots 66 and 68 provide clearance for the outward and inward movement of the spit, as will be presently described.

Positioned within the base 12 below the spit assembly 16 is the fire tray assembly 18 including a firebox 70 in the form of a shallow tray having a flat bottom wall 72. Depending from the bottom wall 72 are a pair of metal ears 74 affixed by means of rivets 76 or the like (FIG. 3). Each of the metal ears 74 has an aperture 78 pivotally receiving the bent end of a link member in the form of an elongated support rod 80, as shown in FIG. 4. The opposite end of each support rod 80 is also bent and pivotally mounted in apertures 82 of brackets 84 affixed to the bottom wall 28 of base 12. This assembly allows vertical movement of the firebox 70 within the interior of base 12 and forward movement of the fire tray with subsequent forward tilting for emptying the contents of the firebox. This forward movement of the firebox 70 is limited by engagement of the support rods 80 with the front wall 24 of the base 12, as shown in FIG. 4.

The fire intensity adjustment assembly 20 includes a positioning rod 86 having axially aligned end portions 88 and 90, and a bent, offset central portion 92. The rod 86 extends longitudinally through the base 12 with the end portions 88 and 90 journalled in the respective front and rear walls 24 and 26 of base 12, for turning movement of the positioning rod 86. The front end portion 88 of rod 86 projects through the base front wall 24 and has an upwardly bent section 94 terminating in a forwardly bent extension 96 (FIGS. 4 and 5) carrying a knob 98. The section 94, extension 96 and knob 98 serve as a manually operable handle by means of which the positioning rod 86 may be rotated to raise and lower the firebox 70 selectively. As the rod 86 is rotated, the offset central portion 92 engages and supports the under surface of the firebox 70, and turns angularly. FIG. 4 shows the central portion 92 turned to a vertically upstanding position in which it has elevated the firebox 70 (shown in phantom) to its furthest extent so that it is located at maximum proximity to the spit 46 and the food carried thereon. As the rod 86 is turned with its central portion 93 approaching a horizontal attitude, the supported firebox 70 is correspondingly lowered to decrease the heat intensity at the spit.

The upwardly bent handle section 94 of positioning rods 86 extends through an elongated slot 100 of an adjustment plate 102 affixed to the base front wall 24. The rear surface of slot 100 communicates with a plurality of spaced stub slots or notches 104 (best seen in FIG. 1) which releasably receive the rod section 94 to lock positioning rod 86 in various positions of adjustment representing selected fire intensities.

In operation of the barbecue grill, charcoal or similar fuel is placed in the firebox 70 so as to be centered beneath the spit 46 in its retracted, operative position. The fuel is preferably ignited before food is placed upon the spit and allowed to reach the proper cooking temperature. By grasping handle 56 and drawing forwardly, the spit 46 is pivoted out to its extended position of FIG. 1, in which it is located forwardly of the ignited fuel. Food is impaled on the spit and gripped by one or more tine members 58, if necessary. In the case of small food particles, such as frankfurters, these may be mounted directly between the tines of a pair of members 58, without being impaled on the spit. In any event, the spit 46 is again cradled in the V-shaped slots 50 of support plates 42, 44, and its end inserted in the mandrel socket 64 of motor housing 60. The spit assembly 16 is now returned to its retracted position of FIG. 3 in which spit 46 is centered directly over the ignited fuel in firebox 70. The spit motor is now energized for rotation of the spit. Intensity of the heat supplied to the food on the spit may be adjusted by raising or lowering the firebox 70 through selective turning of the knob 98.

During the course of cooking, when it is desired to season or otherwise treat the food on spit 46, it is unnecessary to reach within the hood 14 and risk burning the hands. Instead, the spit may be brought to extended position in which it is clear of the heat of the ignited fuel. Complete, safe access may now be had to the food on the spit, and since the motor is also mounted on the support plate 42, it is unnecessary to deenergize the motor when extending the spit for food seasoning, testing, etc.

It will be appreciated that in the extended position of the spit 46, the latter is fully supported at both ends by the respective supporting plates 42 and 44. This construction provides firm two point support of the spit and consequently eliminates any problem of breakage which might occur due to heavy foods mounted on the spit, if the latter were supported only at one end.

When the food is fully cooked, it is not desirable to extinguish the fuel, but rather the charcoal or other fuel is conventionally allowed to burn itself out. To permit ready safe removal of the cooked food from the spit, the spit assembly is again pivoted to its extended position clear of the hot fuel.

To remove the ashes of the burned fuel, it is only necessary to raise the firebox 70 about the level of the base 12, and tilt the same forwardly to the position shown in FIG. 4. The ashes within the firebox 70 will fall instantly away and may be received in a container held beneath the tilted firebox. The support rods 80 guide the firebox in its upward and forward movement, and also retain it in its tilted position.

While a preferred embodiment of the invention has been shown and described herein, it will be obvious that numerous omissions, changes and additions may be made in such embodiment without departing from the spirit and scope of the present invention.

What is claimed is:

1. An improved barbecue grill of the type having a hollow open-top base with an open front hood overlying at least a portion of said base and in communication with the interior thereof to provide a covered heating zone therein, wherein the improvement comprises a pair of rigid support members respectively pivotally mounted in alignment at opposite sides of said base adjacent the front open end of said hood, each of said support members having a slot extending downwardly from its upper end, a spit sized to be rotatably received within the slots of the aligned support members, and motor means having a drive member sized to receive and grip one end of said spit for rotating the latter, said motor means being secured to one of said support members with the drive member thereof in registry with the slot of said support member for receiving the end of the spit supported by said slot, and a pair of aligned slots in the side walls of said hood, extending inwardly from the front open end of said hood, said hood slots being sized and positioned to provide clearance for said spit during movement of said support members from a rearwardly, pivoted retracted position in which said spit is located in the heating zone within the hood, and a forwardly pivoted extended position in which said spit is located forwardly of said hood and outside said heating zone.

References Cited

UNITED STATES PATENTS

| | | | |
|---|---|---|---|
| 1,085,671 | 2/1914 | Day | 99—421 |
| 1,152,184 | 8/1915 | Kluge. | |
| 1,480,119 | 1/1924 | Schey | 99—421 XR |
| 1,642,604 | 9/1927 | Cox | 99—421 |
| 2,718,845 | 9/1955 | Dudley | 99—421 |
| 2,815,707 | 12/1957 | Morrow | 99—421 |
| 2,885,950 | 5/1959 | Stoll et al. | |
| 3,016,816 | 1/1962 | Persinger et al. | |
| 3,040,730 | 6/1962 | Hurko et al. | |
| 3,335,712 | 8/1967 | Marasco. | |

WALTER A. SCHEEL, *Primary Examiner.*

JOHN M. NEARY, *Assistant Examiner.*

U.S. Cl. X.R.

126—25